Aug. 9, 1932.    S. R. VANDEWATER    1,870,301
AUTOMATIC STEREOPTICON CHANGING DEVICE
Filed Feb. 13, 1930    3 Sheets-Sheet 1
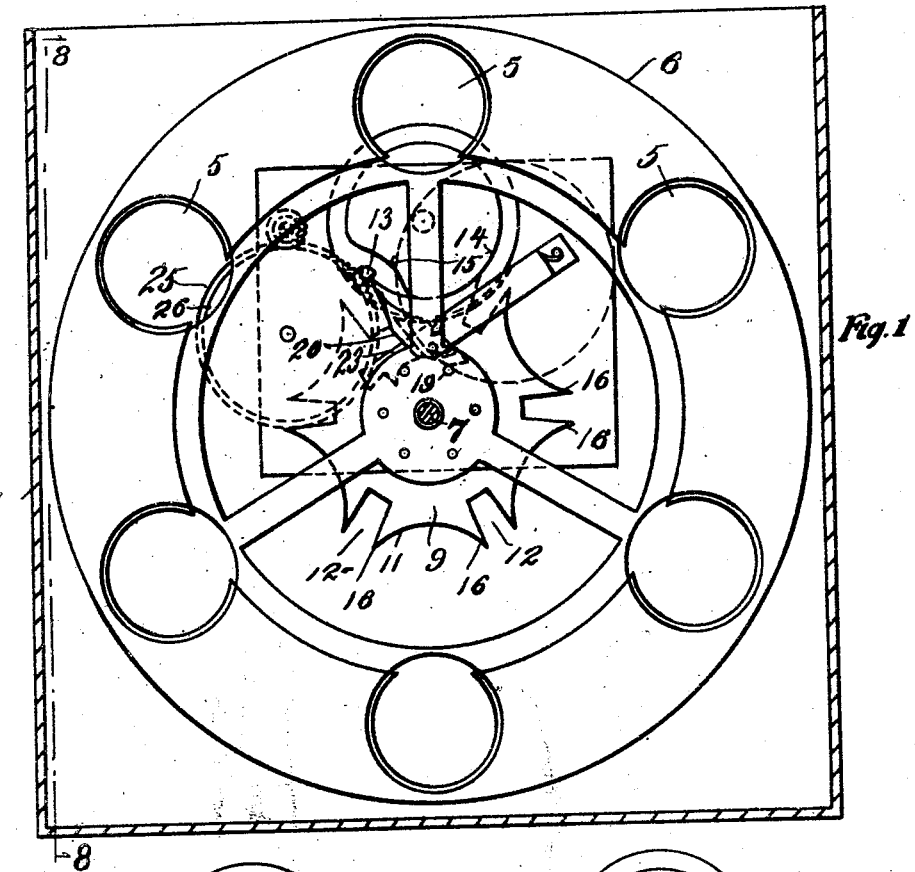
Fig. 1
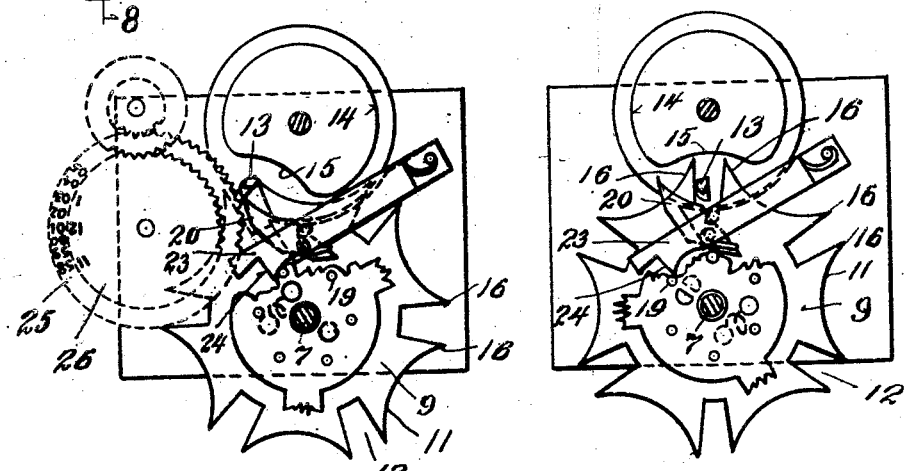
Fig. 3    Fig. 2    INVENTOR.
BY  Steven R. Vandewater
    A. W. Plaisted
    ATTORNEY.

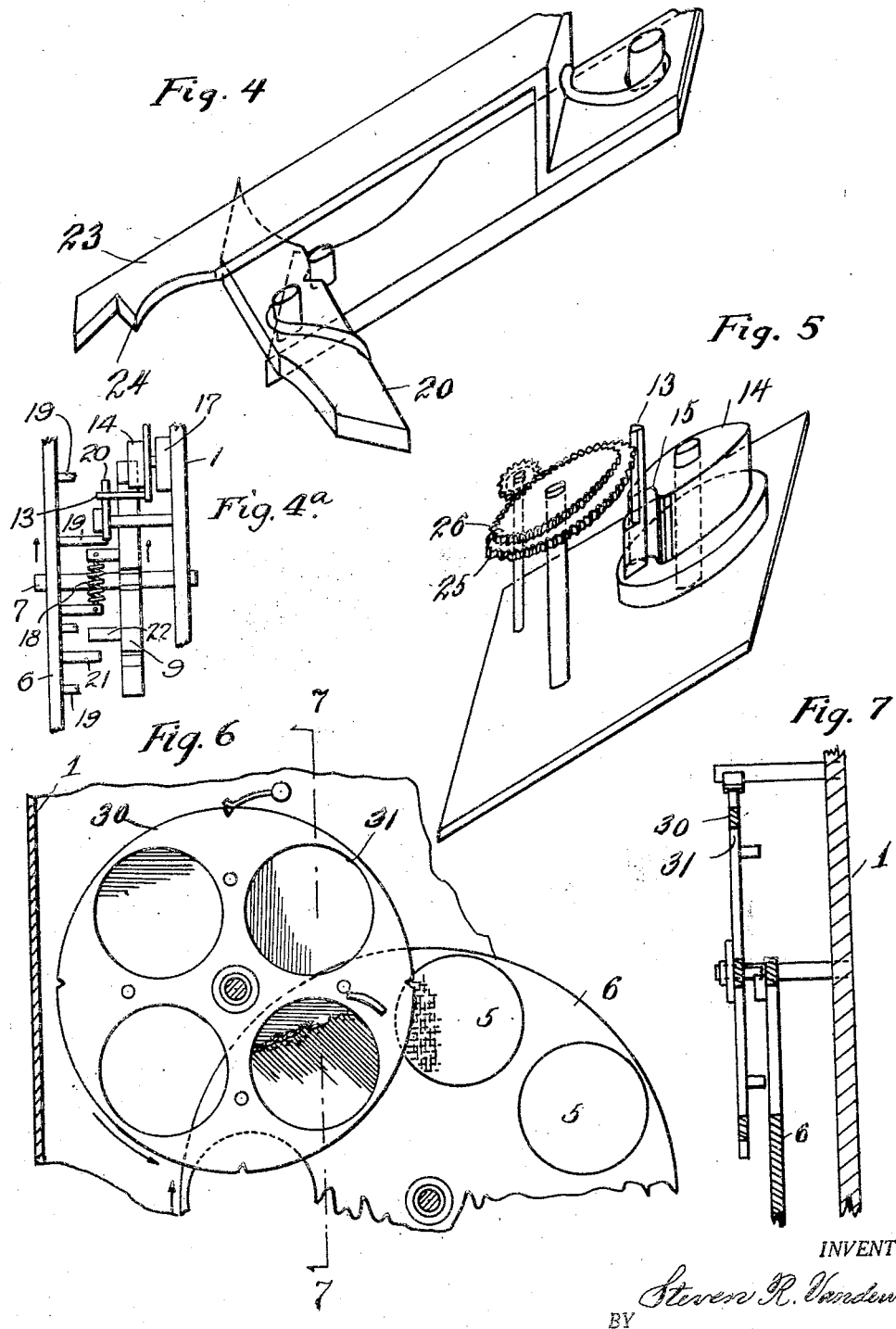

Aug. 9, 1932.  S. R. VANDEWATER  1,870,301
AUTOMATIC STEREOPTICON CHANGING DEVICE
Filed Feb. 13, 1930   3 Sheets-Sheet 3
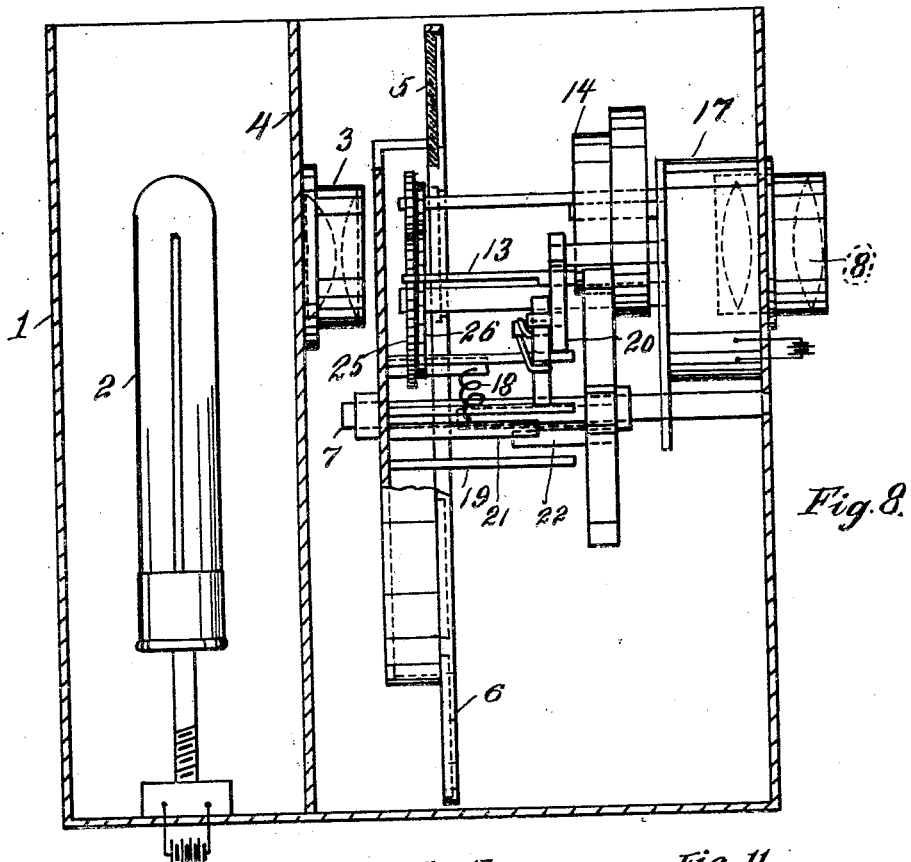
Fig. 8.
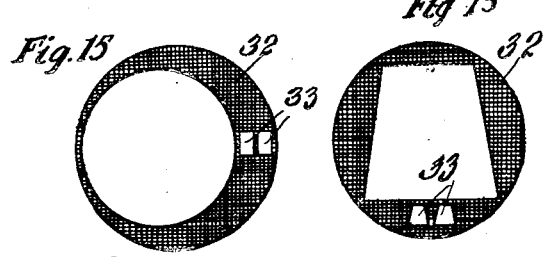
Fig. 15   Fig. 13   Fig. 11
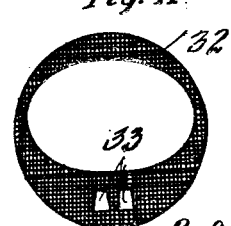
Fig. 9
Fig. 16
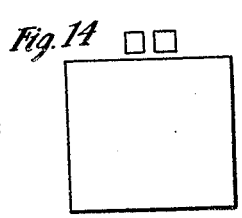
Fig. 14
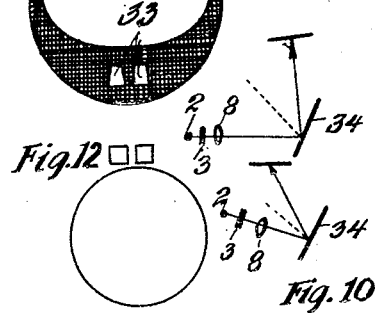
Fig. 12
Fig. 10
INVENTOR.
Steven R. Vandewater
BY
H. M. Plaisted
ATTORNEY.

Patented Aug. 9, 1932

1,870,301

UNITED STATES PATENT OFFICE

STEVEN R. VANDEWATER, OF ST. LOUIS, MISSOURI, ASSIGNOR TO VANDEROY ADVERTISING SYSTEM, INC., OF ST. LOUIS, MISSOURI, A CORPORATION OF MISSOURI

AUTOMATIC STEREOPTICON CHANGING DEVICE

Application filed February 13, 1930. Serial No. 428,002.

This invention relates to certain new and useful improvements in automatic stereopticon changing devices, the peculiarities of which will be hereinafter fully described and claimed.

The main objects of my invention are to improve and simplify the automatic changing of stereopticon views; secondly, to provide a positive stop device for the disc wheel and connected mechanism for a predetermined period of time during which each view is shown; thirdly, to provide a circular detent cam with notch as said stop device; fourthly, to maintain said disc wheel stationary till cam pin has entered a notch, moved the notched disc a step ahead and put the tension on an interposed spring, then said pin leaving the notch engages the release trip, allowing tensioned spring to turn disc wheel a step forward and effect engagement of cove with circular cam; fifthly, to provide a safety detent to prevent backward movement; sixthly, to provide an automatically changeable flood light effect; seventhly, to provide a multicolor disc automatically superposed with reference to the slides in the disc wheel; and eighthly, to provide a color screen which combined with a suitable color stereopticon slide will produce a color effect different from either.

In the accompanying drawings on which like reference numerals indicate corresponding parts, Fig. 1 represents a vertical elevation of my device with the casing in section; and the cove arm engaging the circular cam;

Fig. 2, a partial view of Fig. 1 showing the cove arm passing the circular cam;

Fig. 3, a similar view showing the operative cam pin just leaving a notch and the cove arm about to engage the circular cam;

Fig. 4, a projection view of my release trip and a detent;

Fig. 4A, a detail showing a spring connection between the slide carrying wheel and the notched disc that operates it intermittently.

Fig. 5, a similar view of the circular cam with its operative pin and toothed wheels of a timing device;

Fig. 6, a face view of a color disc wheel overlapping the slide disc wheel;

Fig. 7, a sectional elevation on the line 7—7 of Fig. 6;

Fig. 8, a vertical section of the casing on the line 8—8 of Fig. 1, and side elevation of the contained mechanism;

Fig. 9, a diagrammatic illustration of light rays as reflected from a mirror upon a screen in the usual manner;

Fig. 10, a similar illustration of my method of reflecting light rays through a distorted slide and correcting such distortion by location of mirrors and screen;

Fig. 11, a slide of my distorted form having an elliptical view portion for projection on a mirror from which it is reflected on the screen in correct image and a mask portion having window openings for time figures;

Fig. 12, the circular image appearing on the screen from a slide like Fig. 11;

Fig. 13, a slide of my distorted form having a trapezoidal view portion with mask and windows for time figures;

Fig. 14, a square image appearing on the screen from a slide like Fig. 13;

Fig. 15, a circular view opening in a slide having windows in the mask portion for projecting the time figures directly upon a screen; and Fig. 16, the projected image from Fig. 15 showing the time figures separated from but adjacent to the image also directly projected upon the screen as in the present construction now to be described.

In stereopticon clocks to which this device belongs, a series of images is projected upon a screen by means of light rays passing through copy slides which are changed at definite periods to make a corresponding change in the image on the screen. It is my main object to effect automatically such change of slides by improved construction now to be described.

The numeral 1 designates a suitable casing in which is mounted a lamp 2 having suitable electrical connections and adapted to project its light rays through a condenser 3 mounted on an adjacent partition 4 (Fig. 8). The light rays will then pass through one of a series of slides 5 mounted in a slide carrying disc wheel 6 equidistant from a horizontal shaft 7 on which the slide carrying disc wheel is loosely mounted and is removable to change slides. A projecting lens 8 in the front of the casing receives said light rays passing through the slide at the time opposite the condenser and throws an image upon a suitable screen for advertising and other purposes.

The shaft 7 is stationary. On the same shaft behind the slide disc wheel 6 is also loosely mounted and rotatable at different speed from the wheel 6, a gear disc having arms 9 ending in a cove or circular arc 11. Between these arms are notches 12 substantially radial adapted to be engaged by an operative pin 13 on the flange of the circular cam 14 in which cam there is a notch 15 adjacent to said pin and forming a cut out portion of its circular outline and adapted to allow the travel past the cam of horns 16 at the ends of the cove 11, which cove portion fits snugly against the circular portion of said cam 14. The circular cam with its operative pin is driven by a motor 17 electrically connected, so that the cam rotates steadily at a suitable rate in the same direction as the hands of a watch, and turns the cove arm 9 in the contrary direction by engagement of the pin 13 with the notches 12. Each time the pin 13 comes around it enters one of the notches 12 between the cove arms 9 above described and operates the latter a step ahead. That is to say, the said pin enters the notch at one side of the center and leaves the notch at the other side of the center giving a definite rotative step to the notched disc, the horns 16 of which enter the notch 15 of the circular cam and pass the latter as shown in Fig. 2. When the said pin 13 is leaving its notch, (see Figs. 1 and 3) the cove 11 of the arm 9 is about to engage the circular portion of the cam and thus check the movement of the notched disc till the operative pin comes around and enters the next notch. This forward movement of the notched disc has tensioned a spring 18 (Fig. 4A) forming a flexible connection between the slide disc wheel and the notched disc. The said wheel has a circular row of stop pins 19 projecting from its face which are engaged by a release trip 20 (Fig. 4). The opposite end of this trip is engaged by the pin 13 as it leaves the notch and thus disengages the other end of the trip from the adjacent stop pin 19 allowing the spring 18 to turn the slide disc wheel a certain distance ahead to bring another copy slide opposite the condenser.

This step ahead movement of the slide disc wheel under the tension of the spring 18 is limited by a dog 21 on the wheel engaging a dog 22 on the notched disc which can not turn because the cove 11 is engaged with the circular cam as shown in Fig. 1.

One end of this flexible connection 18 is attached to a projection from the notched disc, and the other end to a similar projection from the slide carrying wheel 6 (Figs. 4A and 8). The notched disc is turned a step forward by the cam pin 13 and tensions the spring 18; this spring tension exerts a rotative pull on the slide carrying wheel acting when the detent 20 is lifted by the cam 13 from engagement with the pin 19. This spring pull causes the slide wheel to snap ahead till the said dogs meet and stop it with the next slide in operative position opposite the lamp and lens. Such forward step of the slide carrying wheel slackens the spring 18 till it is again tensioned by the next rotative movement of the notched disc actuated by the cam pin 13, as above described. In other words, the notched disc is first turned a step forward by the pin 13, the spring 18 is thus tensioned. The wheel is temporarily held by the detent 20 but when released the tension spring snaps the wheel ahead to catch up with the notched disc by a rotative step by step movement in which the notched disc turns first slowly, and then the wheel turns with a snap relative to the disc, till the dogs 21 and 22 engage and stop it. Thus changing to the next slide is practically instantaneous. In Figs. 2 and 3 this spring is indicated in dashed lines. In Fig. 4A it is plainly shown with one end connected to a projection from the wheel 6 and the other end to a projection from the notched disc. This spring constitutes a flexible connection between the wheel and the notched disc through which the former is intermittently operated by the latter, and at relatively different speed.

To prevent the backward movement of the wheel, a spring detent arm 23 drops behind an adjacent stop pin 19. These pins as the wheel turns lift up this detent till they pass its point 24 when it drops behind the pin and prevents backward movement of the wheel as stated.

A time device comprising transparent toothed wheels and suitable gearing is mounted adjacent to the operative pin 13. The larger one 25 of said toothed wheels bears figures representing minutes, while the smaller one 26 bears numbers representing the hours from one to twelve. The larger wheel 25 is in the path of the operative pin 13 as it leaves the notch 12 as shown in Fig. 1. Movement is thus given to these wheels 25 and 26 to bring their numbers successively over the edge of a copy slide adjacent. The numbers, both hour and minute numbers, are thus projected with the slide view upon the screen and the clock time thus given to the observer. The operative pin 13 is provided with a sharp angular edge adapted to engage said toothed wheel 25. Thus the time of the slide exposed is given by figures separate from the copy slide itself. Copy slides are sometimes tinted various colors singly or several colors on the same slide, and sometimes they are quite clear without coloring. Being mounted in their disc wheel 6, I effect a change in the tint of the projected image by superposing adjacent to the copy disc wheel, another disc wheel 30 having openings 31 for colored discs which are adapted to pass in front of the slide being exposed by means of the color disc 30 overlapping the slide disc 6, as shown in Fig. 6. Thus if the copy slide in wheel 6 is clear, the color disc in the color wheel 30 will tint the image accordingly. If the next copy slide in the wheel 6 to be exposed is blue, and the color disc is yellow, the tint of the resulting image on the screen will be green. Thus the tint of the image on the screen, can be varied by turning the color disc wheel 30 so that another color disc is superposed over the same slide, giving an instantaneous change of tint of the screen image while being shown; or the rotation of the color disc wheel 30 may be such that the same copy slide in the wheel 6 may appear of one tint during the interval that it is shown, and the next time the same slide comes around and another color disc is superposed, it will show a different tint.

The copy slides thus directly projected on the screen, have a mask portion 32 (Fig. 15) in which are windows 33 for the projection of the figures indicating the minute and hour as shown in Fig. 16.

The above form of copy slide is for direct projection of light rays through the slide upon the screen. In cases where the light rays are projected upon an inclined mirror 34 from which they are reflected upon a screen as indicated in Fig. 9, the circular view of the copy slide would appear in a distorted image,—i. e. elliptical in form. I therefore provide a copy slide that is elliptical in its view portion so that when reflected by a mirror upon a screen or other surface, the distortion of the slide itself will be corrected and a different image be shown.

Thus the copy slide shown in Fig. 11 with mask having window openings as above described will be shown circular upon the screen or other reflecting surface.

Another example is shown in Fig. 13 in which the mask surrounds a view portion that is a trapezoid which will appear as a square or rectangle in the image as shown in Fig. 14. Thus the light rays passing through the distorted slide will be corrected as per diagram Fig. 10, and the desired image will be properly shown upon the screen or other surface when mirrors are used.

In illustration of this change of color by two overlapping slides of different colors, Fig. 6 shows a slide 5 of yellow tint (indicated by cross broken lines). When such a yellow slide is covered by a slide tinted blue (indicated by horizontal lines) in the disc 30, the resulting color of the projected image will be green (as indicated by lines inclined downward to the right in the broken away portion of the blue disc). In other words, the broken away portion in which green is indicated, will be the resulting appearance of the overlapped combinaton of a yellow tinted slide 5 and a blue tinted slide of the disc 30, Fig. 6. Above said blue tinted color slide is a similar slide in the disc 30 which is red or pink tint (indicated by vertical lines), and at the left of the latter is another color slide of blue tint (indicated by parallel lines). Below the last named color slide is a clear portion in the wheel 30, which when turned to coincide with one of the slides 5, will allow the original tint (in this instance yellow) to be projected unchanged upon the screen.

I claim:

1. A device of the character described comprising a stationary shaft, a slide carrying disc wheel and a notched disc both loosely mounted on the said shaft, a spring connection between said discs having its ends fastened to respective projections on said wheel and disc that are further separated by a forward rotative step of the notched disc to tension said connection, the notched disc having a cove between said notches, a circular cam adapted to engage the adjacent cove and having a notch, an operative pin carried by said cam adapted to engage said disc notches successively and rotate the notched disc a step ahead till the cove and cam portions engage, detent means to hold the slide carrying wheel still while the notched disc makes a partial revolution and tripped by said pin, and means to rotate said cam, substantially as described.

2. A device of the character described comprising a shaft, a slide carrying disc wheel and a notched disc having circular arcs between said notches, both mounted loosely on said shaft, a spring connection between said disc and wheel having its ends fastened to respective projections from said wheel and disc that are further separated by a forward rotative step of the notched disc to tension said connection, a circular cam having a notch, an operative pin carried by said cam adjacent said notch and adapted to engage successively said notched disc,—the edge of said pin being angular, a detent to hold the slide carrying wheel still while the notched disc makes a partial revolution and tripped by said pin, a transparent toothed wheel, and operative means to rotate said transparent wheel as a timing device and having its teeth in the path of said operative pin,—said timing device having numbers indicating hours and minutes thereon, substantially as described.

3. A device of the character described comprising a slide carrying disc wheel having a row of stop pins projecting from its face, a release trip normally engaging a stop pin on said wheel at one end, and forming a detent to hold the slide carrying wheel still temporarily, an operative pin rotatably mounted and adapted to engage the other end of said trip and disengage its opposite end, a notched disc having operative spring connections with said wheel, said spring connection having its ends fastened to respective wheel and disc projections that are further separated by a forward step of the notched disc to tension said connection while said trip temporarily holds the wheel, and stop dogs respectively mounted on wheel and disc and limiting the forward released movement of said wheel with respect to said notched disc, substantially as described.

4. A device of the character described comprising a slide carrying disc wheel with copy slides of different tints mounted therein, means to rotate said wheel by steps, a detent to hold the slide carrying wheel still between said steps, a color disc wheel mounted to overlap the adjacent copy slide and having color discs of various tints, means to rotate said color disc wheel by steps to combine the tints in both wheels and vary the tint of the projected image, and operative lamp and lens devices to project light rays through said copy slide and color disc in their successive positions, substantially as described.

5. A device of the character described comprising a slide carrying disc wheel having a stop projection, a notched disc rotatably mounted independently from said wheel and having a matching stop projection, a spring connection between said projections tending to bring said stops together and tensioned by a forward movement of said notched disc, a detent holding the slide carrying wheel still while said notched disc makes a partial revolution, and means to rotate said notched disc intermittently, substantially as described.

6. A device of the character described comprising a stationary shaft, a slide carrying disc wheel and an independently rotatable notched disc loosely mounted on said shaft, means to rotate said disc, a flexible connection between said wheel and disc exerting a rotative pull on the former, means to resist said pull temporarily, and stop dogs on wheel and disc limiting the relative movement of said wheel to said notched disc, substantially as described.

In testimony whereof I have affixed my signature.

STEVEN R. VANDEWATER.